US012508604B2

(12) United States Patent
Kim et al.

(10) Patent No.: US 12,508,604 B2

(45) Date of Patent: Dec. 30, 2025

(54) NOZZLE ASSEMBLY AND BIDET INCLUDING SAME

(71) Applicant: COWAY CO., LTD., Gongju-si (KR)

(72) Inventors: Young Pyo Kim, Seoul (KR); Jong Hyun Park, Seoul (KR); Sung Worl Jin, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 131 days.

(21) Appl. No.: 18/565,639

(22) PCT Filed: May 16, 2022

(86) PCT No.: PCT/KR2022/006977

§ 371 (c)(1),
(2) Date: Nov. 30, 2023

(87) PCT Pub. No.: WO2022/255689

PCT Pub. Date: Dec. 8, 2022

(65) Prior Publication Data

US 2024/0261806 A1 Aug. 8, 2024

(30) Foreign Application Priority Data

Jun. 3, 2021 (KR) ........................ 10-2021-0072359

(51) Int. Cl.
*B05B 1/16* (2006.01)
*E03D 9/08* (2006.01)

(52) U.S. Cl.
CPC .............. *B05B 1/1645* (2013.01); *E03D 9/08* (2013.01)

(58) Field of Classification Search
CPC ........... B05B 1/1645; B05B 1/14; B05B 1/16; B05B 1/18; B05B 13/02; E03D 9/08
(Continued)

(56) References Cited

U.S. PATENT DOCUMENTS 5,385,303 A * 1/1995 Gosselin ................ B65D 83/44 239/394
8,060,953 B1 * 11/2011 Dorra .................. A47K 13/302 4/444
(Continued)

FOREIGN PATENT DOCUMENTS

JP 7-119196 B2 12/1995
JP 2002-294821 A 10/2002
(Continued)

OTHER PUBLICATIONS

International Search Report issued Aug. 16, 2022 in PCT/KR2022/006977 filed on May 16, 2022 citing documents 15-19 therein, 5 pages (with English Translation).

*Primary Examiner* — Lori L Baker
(74) *Attorney, Agent, or Firm* — Oblon, McClelland, Maier & Neustadt, L.L.P.

(57) ABSTRACT

A bidet includes: a housing having a water inflow channel and a water discharge channel; and a fluid channel switching member in which a first fluid channel that provides a path allowing a washing liquid introduced from the water inflow channel to flow therethrough and a second fluid channel that does not communicate with the first fluid channel are formed, the switching member being selectively placed in any one of a first water discharge state in which the water inflow channel communicates with the first fluid channel and a second water discharge state in which the water inflow channel communicates with the second fluid channel; a case which supports the fluid channel switching member and is disposed in the housing; and a nozzle having one end extending to be exposed to out of the case and the other end disposed inside the case to communicate with the first fluid channel.

8 Claims, 7 Drawing Sheets

(58) Field of Classification Search
USPC .................................. 4/420.4, 420, 447–448
See application file for complete search history.

(56) References Cited

U.S. PATENT DOCUMENTS

| | | | | |
|---|---|---|---|---|
| 2012/0205405 | A1* | 8/2012 | Zink | B08B 3/02 251/336 |
| 2018/0085763 | A1* | 3/2018 | Leckner | B05B 1/16 |
| 2020/0230636 | A1* | 7/2020 | Burns | B05B 7/2486 |
| 2021/0245190 | A1* | 8/2021 | Kikuchi | B05B 7/1263 |
| 2022/0331828 | A1* | 10/2022 | Katsuda | A61L 2/022 |
| 2024/0276675 | A1* | 8/2024 | Subrahmanyam | B05B 15/70 |

FOREIGN PATENT DOCUMENTS

| | | | | | |
|---|---|---|---|---|---|
| JP | 2019-27013 | A | | 2/2019 | |
| KR | 10-1531387 | B1 | | 6/2015 | |
| KR | 10-2017-0133053 | A | | 12/2017 | |
| WO | WO-2022255689 | A1 | * | 12/2022 | B05B 1/14 |
| WO | WO-2024133586 | A1 | * | 6/2024 | B05B 1/083 |
| WO | WO-2025008410 | A1 | * | 1/2025 | B05B 1/083 |

* cited by examiner

NOZZLE ASSEMBLY AND BIDET INCLUDING SAME

TECHNICAL FIELD

The present disclosure relates to a nozzle assembly and a bidet including the nozzle assembly.

BACKGROUND ART

Generally, a bidet is a device that is installed on the top of a toilet bowl and washes a local area such as a user's genitals or anus. The bidet may spray cleaning water from a center thereof toward the user, and may include a cleaning nozzle that sprays the cleaning water. Further, the bidet may spray washing liquid toward the cleaning nozzle so as to wash the cleaning nozzle, and may include a washing nozzle to spray the washing liquid.

The washing nozzle is used to spray the washing liquid toward the cleaning nozzle, but it is difficult to sterilize the interior of the toilet bowl. Accordingly, there has been developed a bidet equipped with a sterilizing nozzle that may spray the washing liquid into the toilet bowl as well as the washing nozzle.

The applicant's US Patent Laid-Open Publication No. 2019/0071856 entitled "Sterilizing water spray device and bidet including the same" (Patent Literature 1) discloses a nozzle for cleaning anus and a sterilizing water spray device. In Patent Literature 1, the bidet is provided with a cleaning nozzle that sprays cleaning water and a sterilizing water spray device that sprays washing liquid. Although not shown in Patent Literature 1, a washing nozzle may also be provided to spray washing liquid for washing the cleaning nozzle.

However, since the washing nozzle and the sterilizing water spray device of Patent Literature 1 receive washing liquid from each fluid channel, separate valves should be provided to control the flow of each washing liquid. That is, the number of fluid channels through which washing liquid flows as well as the number of valves for controlling the flow increases. Thereby, the volume occupied by the fluid channels and valves within the bidet increases, and the cost of providing the separate fluid channels and valves increases.

Therefore, there is a need for a nozzle assembly that minimizes the number of valves and fluid channels and causes washing liquid to selectively flow to a washing nozzle or a sterilizing nozzle simply by driving a motor that rotates the nozzle.

RELATED LITERATURE

[Patent Literature 1] US Patent Laid-Open Publication No. 2019/0071856 (Mar. 7, 2019)

DISCLOSURE

Technical Problem

The present disclosure has been made to solve the above-mentioned problems, and an embodiment of the present disclosure provides a nozzle assembly that allows washing liquid to selectively flow toward a washing nozzle or a sterilizing nozzle simply by operating a motor that rotates the nozzle.

Further, the present disclosure provides a nozzle assembly that can reduce cost by minimizing the number of valves and fluid channels.

Technical Solution

In accordance with one embodiment of the present disclosure, there is provided a nozzle assembly comprising: a housing provided with a water inflow channel and a water discharge channel; a fluid channel switching member in which a first fluid channel that provides a path allowing a washing liquid introduced from the water inflow channel to flow therethrough and a second fluid channel that does not communicate with the first fluid channel are formed, wherein the fluid channel switching member may be selectively placed in any one of a first water discharge state in which the water inflow channel communicates with the first fluid channel and a second water discharge state in which the water inflow channel communicates with the second fluid channel; a case which supports the fluid channel switching member and is disposed in the housing; and a nozzle having one end extending to be exposed to an outside of the case and the other end disposed inside the case to communicate with the first fluid channel, wherein the fluid channel switching member is configured such that the fluid channel switching member rotates at a predetermined angle about an imaginary rotation axis extending along an extension direction of the nozzle within the housing to change from any one of the first water discharge state and the second water discharge state to the other state, wherein the fluid channel switching member guides a flow of the washing liquid so that the washing liquid introduced through the water inflow channel flows through the first fluid channel toward the nozzle, when the fluid channel switching member is in the first water discharge state, and wherein the fluid channel switching member guides the flow of the washing liquid so that the washing liquid introduced through the water inflow channel bypasses the first fluid channel and flows through the second fluid channel toward the water discharge channel, when the fluid channel switching member is in the second water discharge state.

Further, the first fluid channel may have a shape of a hole extending along a circumferential direction of the fluid channel switching member so that both ends thereof are spaced apart from each other, and the second fluid channel may have a shape of a hole extending along a linear direction that is offset from the circumferential direction, and at least a portion of the second fluid channel is placed on an imaginary curve extending along the circumferential direction between both ends of the first fluid channel.

Further, the nozzle may further include a plurality of outlets that communicate with the second fluid channel to discharge the washing liquid, and the first fluid channel may be extended so that an angle between two imaginary straight lines extending from a center of the fluid channel switching member toward the both ends exceeds a predetermined rotation angle, and the predetermined rotation angle may satisfy the following equation, $$\text{Rotation angle}=360°/N \ (N \text{ is a number of outlets}). \quad \text{[Equation]}$$

Further, the water inflow channel may be connected to a surface of the housing to communicate with an interior of the housing, and the nozzle assembly may further comprise: an elastic part providing elastic force to the fluid channel switching member in a direction in which the fluid channel switching member comes into close contact with the surface so that the fluid channel switching member is rotated while being in close contact with the surface of the housing.

Further, the fluid channel switching member may further include: a switching part in which the first fluid channel and the second fluid channel are formed, the switching part coming into close contact with the surface of the housing; and a holder part supported by the case and holding the switching part, wherein the elastic part is held by the holder part to provide the elastic force to the switching part.

Further, the nozzle assembly may further comprise: a driving part that rotates the case about the imaginary rotation axis, wherein the fluid channel switching member is rotated in response to the case rotated by the driving part to change from any one of the first water discharge state and the second water discharge state to the other state.

In accordance with another embodiment of the present disclosure, there is provided a bidet comprising: the nozzle assembly described above; and a frame that supports the nozzle assembly and is to be supported on a toilet bowl.

Advantageous Effects

In accordance with the embodiment of the present disclosure, washing liquid can selectively flow toward a washing nozzle or a sterilizing nozzle simply by operating a motor that rotates the nozzle.

Further, cost can be reduced by minimizing the number of valves and fluid channels.

MODE FOR DISCLOSURE

Hereinafter, a specific embodiment of the present disclosure for implementing the idea of the present disclosure will be described in more detail with reference to the accompanying drawings.

Further, in describing the present disclosure, when it is determined that detailed descriptions of known configurations or functions may obscure the gist of the present disclosure, the detailed descriptions will be omitted.

When an element is referred to as being ‘connected to’, ‘supported by’, ‘introduced in’, ‘flowed to’, or ‘discharged to’ another element, it should be understood that the element may be directly connected to, supported by, flowed in, moved to, or discharged to the other element, but that other elements may exist between the elements.

The terms used in the present specification are only used for describing the specific embodiment, and are not intended to limit the present disclosure. Singular expressions include plural expressions unless the context clearly indicates otherwise.

The terms including ordinal numbers, such as first, second, etc., may be used for describing various elements, but the corresponding elements are not limited by these terms. These terms are only used for the purpose of distinguishing one element from another element.

The meaning of “including” used in the present specification specifies specific features, regions, integers, steps, operations, elements and/or components, and does not exclude the presence or addition of other specific features, regions, integers, steps, operations, elements, components, and/or groups.

Further, in the present specification, it should be noted that an expression for a direction such as an up-down direction is described on the basis of the drawings and may be expressed differently if the direction of an associated object changes. Meanwhile, in the present specification, the up-down direction may be the up-down direction of FIGS. 4, 6, and 7.

Hereinafter, the specific configuration of a bidet 1 according to an embodiment of the present disclosure will be described.

Figure 1:
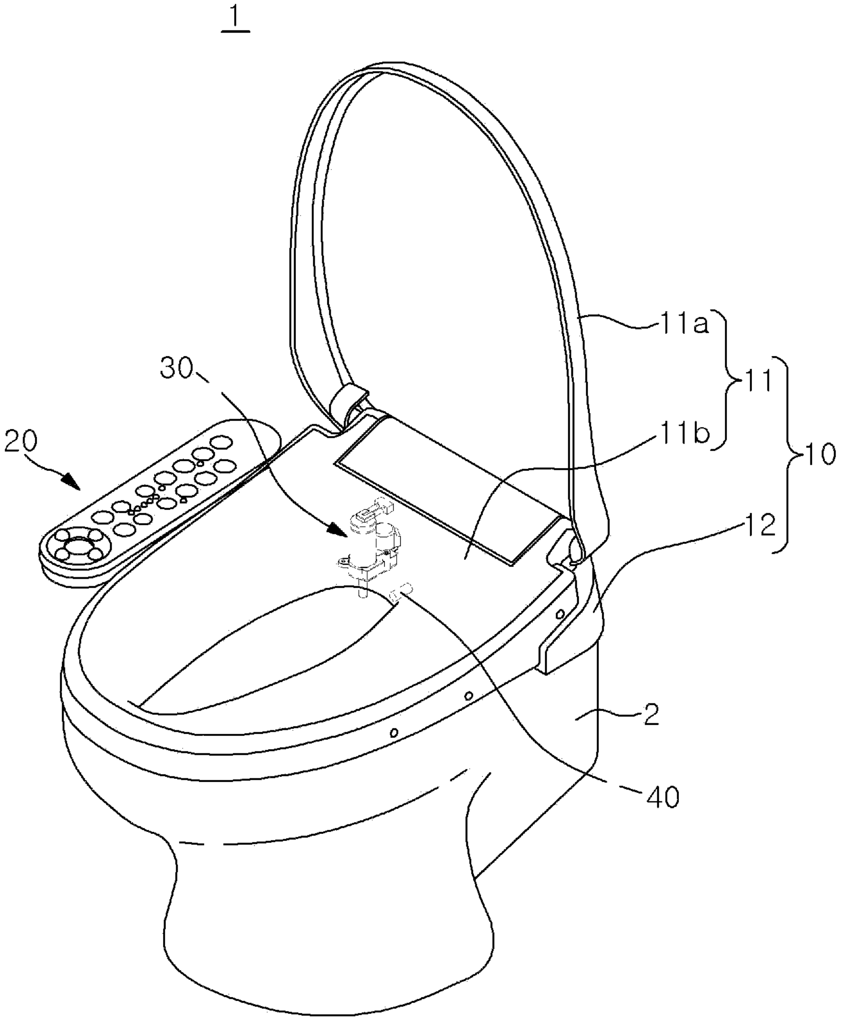
FIG. 1 is a perspective view illustrating a bidet according to an embodiment of the present disclosure.

Referring to FIG. 1, the bidet 1 according to an embodiment of the present disclosure may clean a user’s local area by spraying cleaning water on the user’s local area. Further, the bidet 1 may sterilize/wash a bowl by spraying washing liquid on the bowl. For example, the bidet 1 may be installed on the top of a toilet bowl 2. Such a bidet 1 may include a frame 10, an input part 20, a nozzle assembly 30, and a washing part 40.

The frame 10 may support the input part 20 and the nozzle assembly 30. Further, the frame 10 may be supported on the top of the toilet bowl 2. Such a frame 10 may include an upper frame 11 and a lower frame 12.

The upper frame 11 may be secured to the lower frame 12. Such an upper frame 11 may include a cover 11*a* and a seat 11*b*. Further, the cover 11*a* and the seat 11*b* may be rotatably hinged to the lower frame 12.

The lower frame 12 may be fixedly installed on the top of the toilet bowl 2, and the nozzle assembly 30 may be fixed therein.

The input part 20 may include a plurality of buttons so that the user may input operations through the buttons. For example, the user may input a desired operation for the bidet 1 through the input part 20. Such an input part 20 may be supported on a side of the frame 10.

Figure 2:
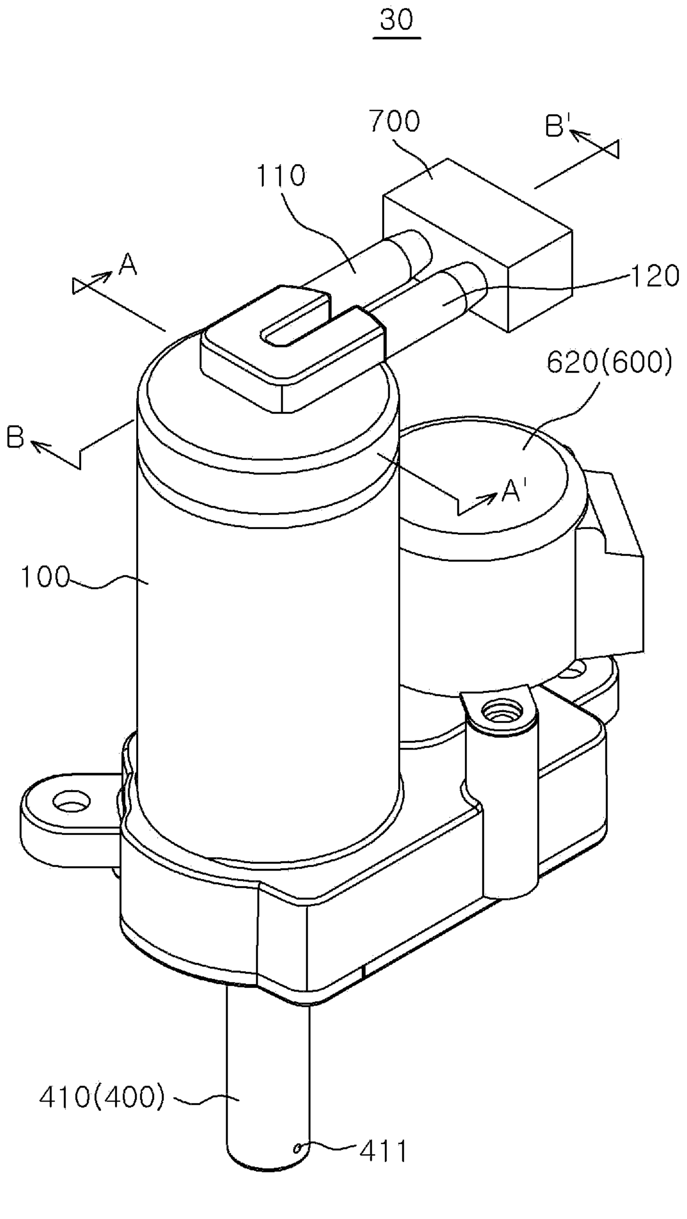
FIG. 2 is a perspective view illustrating a nozzle assembly of FIG. 1.
Figure 3:
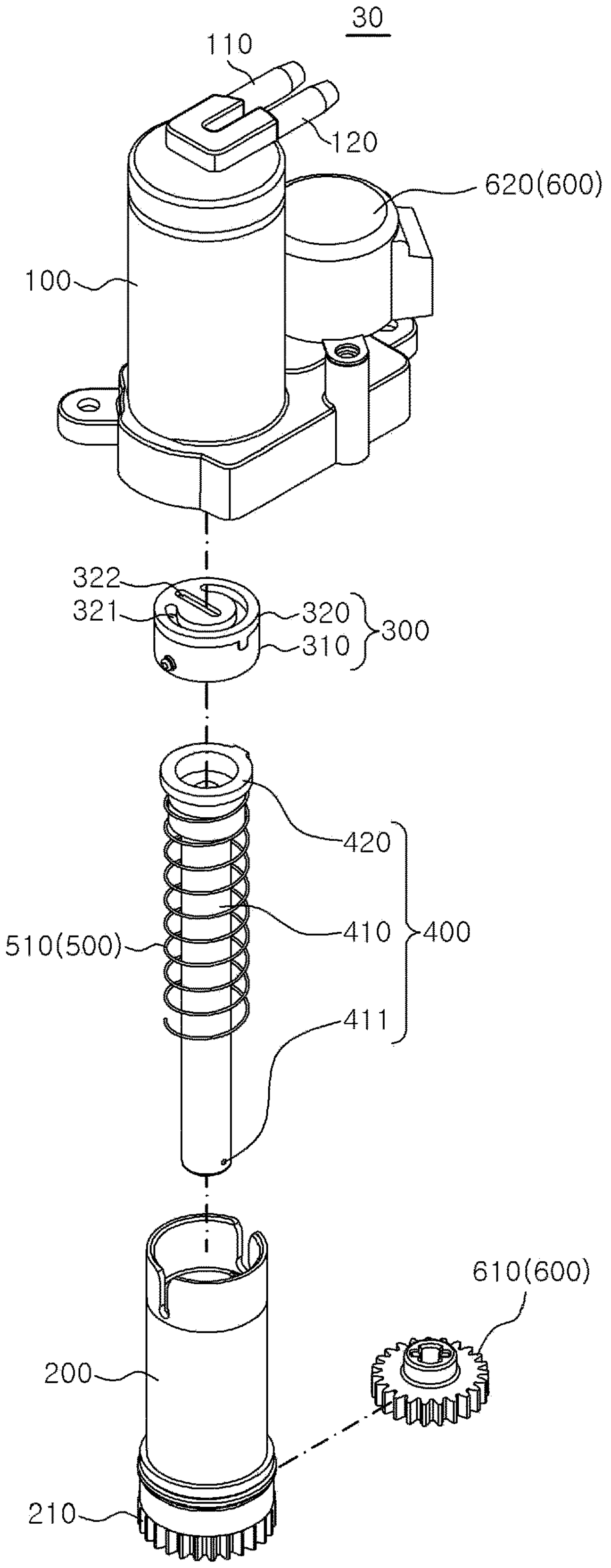
FIG. 3 is an exploded perspective view illustrating the nozzle assembly of FIG. 2.

Referring to FIGS. 2 and 3, the nozzle assembly 30 may discharge washing liquid into the toilet bowl 2.

Further, the nozzle assembly 30 may be supported in the lower frame 12, and at least a portion of the nozzle assembly may protrude from the lower frame 12 into the toilet bowl 2. Such a nozzle assembly 30 may include a housing 100, a case 200, a fluid channel switching member 300, a nozzle 400, an elastic part 500, a driving part 600, a valve part 700, a sensor 800, and a control device 900.

The housing 100 may accommodate the case 200, the nozzle 400, the elastic part 500, and the driving part 600 therein. Such a housing 100 may be connected to a water inflow channel 110 and a water discharge channel 120 through which washing liquid flows.

The water inflow channel 110 may receive washing liquid and guide the washing water to the fluid channel switching member 300. Such a water inflow channel 110 may selectively communicate with a first fluid channel 321 and a second fluid channel 322, which will be described later.

The water discharge channel 120 may guide the washing liquid introduced from the second fluid channel 322 to the washing part 40.

Herein, the washing liquid is a liquid having a washing and/or sterilizing function. For example, the washing liquid may be simple tap water, but may also be electrolyzed sterilizing water with a sterilizing/washing effect, detergent itself, or a mixed solution containing detergent or the like in tap water. However, the present disclosure may use any liquid without being limited thereto as long as the liquid has the washing or sterilizing function. For example, when the water inflow channel 110 communicates with the first fluid channel 321, the washing liquid may be introduced into the water inflow channel 110. As another example, when the water inflow channel 110 communicates with the second fluid channel 322, the washing liquid may be introduced into the water inflow channel 110

The case 200 may be configured to be rotatable about an imaginary rotation axis in the housing 100. Herein, the imaginary rotation axis may refer to an imaginary rotation axis extending along a direction in which the case 200 extends, for example, along the up-down direction of FIG. 6. Further, the case 200 may accommodate at least a portion of the nozzle 400 therein, and may support the nozzle 400 to be movable. Further, a predetermined space may be defined in the case 200 to accommodate the washing liquid therein.

A nozzle gear 210 may be provided on an outer circumference of the case 200. Further, the nozzle gear 210 may engage with a drive gear 610 to be described later, and may be rotated by the drive gear 610. As the nozzle gear 210 rotates, the case 200 may rotate about the imaginary rotation axis.

Figure 4:
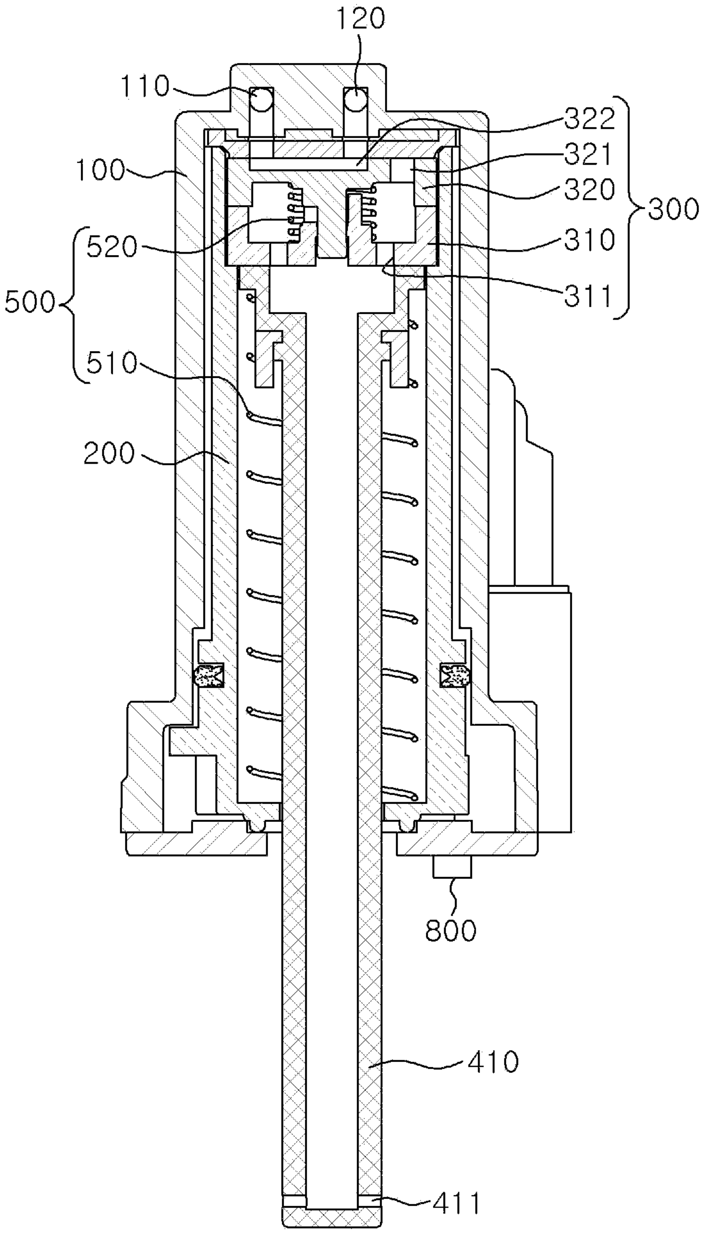
FIG. 4 is a sectional view taken along line IV-IV of FIG. 2.

Referring to FIG. 4, the fluid channel switching member 300 may allow the selective communication of the water inflow channel 110 or the water discharge channel 120, and may cause the water inflow channel 110 to selectively communicate with the interior of the case 200. For example, when the fluid channel switching member 300 is in a first water discharge state, the water inflow channel 110 communicates with the interior of the case 200, and the water inflow channel 110 does not communicate with the water discharge channel 120. In this case, the fluid channel switching member 300 may guide the flow of the washing liquid so that the washing liquid introduced through the water inflow channel 110 flows through the first fluid channel 321 toward the nozzle 400. Further, when the fluid channel switching member 300 is in a second water discharge state, the water inflow channel 110 does not communicate with the interior of the case 200, and the water inflow channel 110 communicates with the water discharge channel 120. In this case, the fluid channel switching member 300 may guide the flow of the washing liquid so that the washing liquid introduced through the water inflow channel 110 bypasses the first fluid channel 321 and flows through the second fluid channel 322 toward the water discharge channel 120.

The fluid channel switching member 300 may be supported by the case 200 to rotate together with the case 200. For example, when the nozzle gear 210 is rotated by the driving part 600, the fluid channel switching member 300 may rotate relative to the housing 100. In this case, the fluid channel switching member 300 may rotate at a predetermined angle about the imaginary rotation axis extending along the extension direction of the nozzle 400. In this way, the fluid channel switching member 300 may rotate relative to the housing 100 to be switched to the first water discharge state or the second water discharge state. The state of the fluid channel switching member 300 may be switched by the driving part 600.

Meanwhile, the fluid channel switching member 300 may have a circular cross-section, for example. Further, the fluid channel switching member 300 may include a holder part 310 and a switching part 320.

The holder part 310 may be supported by the case 200 to rotate together with the case 200. Further, the holder part 310 may hold the switching part 320.

Figure 5:
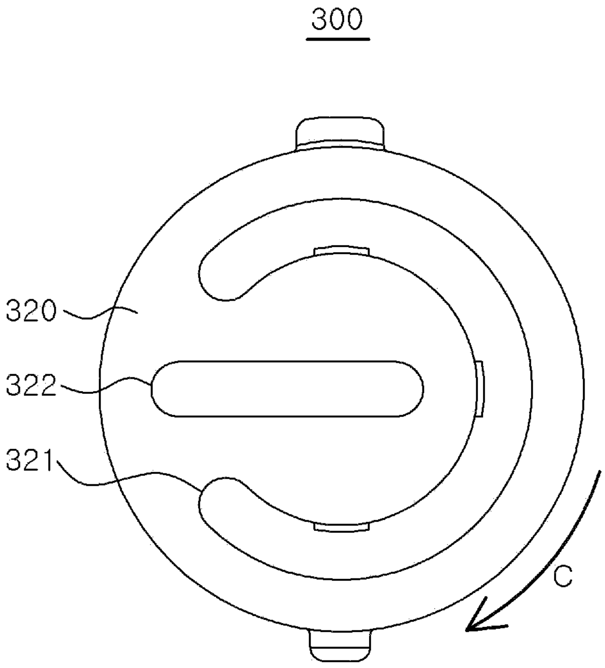
FIG. 5 is a plan view illustrating a fluid channel switching member of FIG. 4.

Referring to FIG. 5, the switching part 320 may be held by the holder part 310, and may rotate together with the holder part 310 when the case 200 rotates. Further, the switching part 320 may be in close contact with the housing 100. For example, upward elastic force may be applied to the switching part 320 by the second elastic member 520, and the switching part may be in close contact with the housing 100 due to the elastic force. Thereby, it is possible to prevent washing liquid from being introduced between the switching part 320 and the housing 100. The first fluid channel 321 and the second fluid channel 322 may be formed in the switching part 320.

The first fluid channel 321 communicates with the internal space of the case 200. For example, when the fluid channel switching member 300 is in the first water discharge state, the first fluid channel 321 may communicate with the water discharge channel 120 and the interior of the case 200. The first fluid channel 321 may extend along a circumferential direction of the fluid channel switching member 300 so that both ends thereof are spaced apart from each other in the circumferential direction, and may be formed as a through hole penetrating along the thickness direction of the fluid channel switching member 300. For example, the fluid channel switching member 300 may be a C-shaped through hole. Further, the first fluid channel 321 may be extended so that an angle between two imaginary straight lines extending from the center of the fluid channel switching member 300 toward both ends of the first fluid channel 321 exceeds a predetermined rotation angle. Here, the rotation angle satisfies the following equation.

$$\text{Rotation angle} = 360°/N\ (N \text{ is the number of outlets } 411) \quad \text{[Equation]}$$

As a more detailed example, when the number of the outlets 411 is two, the first fluid channel 321 may be extended so that the angle between the spaced both ends and the center of the fluid channel switching member 300 is greater than 180° and less than 360°. Ihus, even if the fluid channel switching member 300 rotates by more than 180°, the state may be maintained without switching from the first water discharge state to the second water discharge state. In other words, even if the nozzle 400 rotates by more than 180° while the washing liquid is being discharged through the outlet 411, the washing liquid may be continuously discharged.

The second fluid channel 322 communicates with the water discharge channel 120. For example, when the fluid channel switching member 300 is in the second water discharge state, the second fluid channel 322 may communicate with the water inflow channel 110 and the water discharge channel 120. Such a second fluid channel 322 may have the shape of a hole extending along a linear direction that is offset from the circumferential direction of the fluid channel switching member 300. Further, a portion of the second fluid channel 322 may be placed in the center of the fluid channel switching member 300, while the other portion may be placed on an imaginary curve extending along the circumferential direction between the spaced both ends of the first fluid channel 321. Thus, the water discharge channel 120 always communicates with the second fluid channel 322, and the water inflow channel 110 may selectively communicate with the second fluid channel 322 through the rotation of the fluid channel switching member 300.

The nozzle 400 may provide a fluid channel through which the washing liquid flows, and may discharge the washing liquid to the outside of the housing 100. Such a nozzle 400 may be movably supported in the case 200. Further, one end of the nozzle 400 may be disposed outside the housing 100, while the other end of the nozzle 400 may be disposed in the case 200. Such a nozzle 400 may extend in the same direction as the case 200, and may extend along the imaginary rotation axis, for example. Further, when the case 200 rotates, the nozzle 400 may rotate together with the case 200 while being supported by the case 200.

Figure 6:
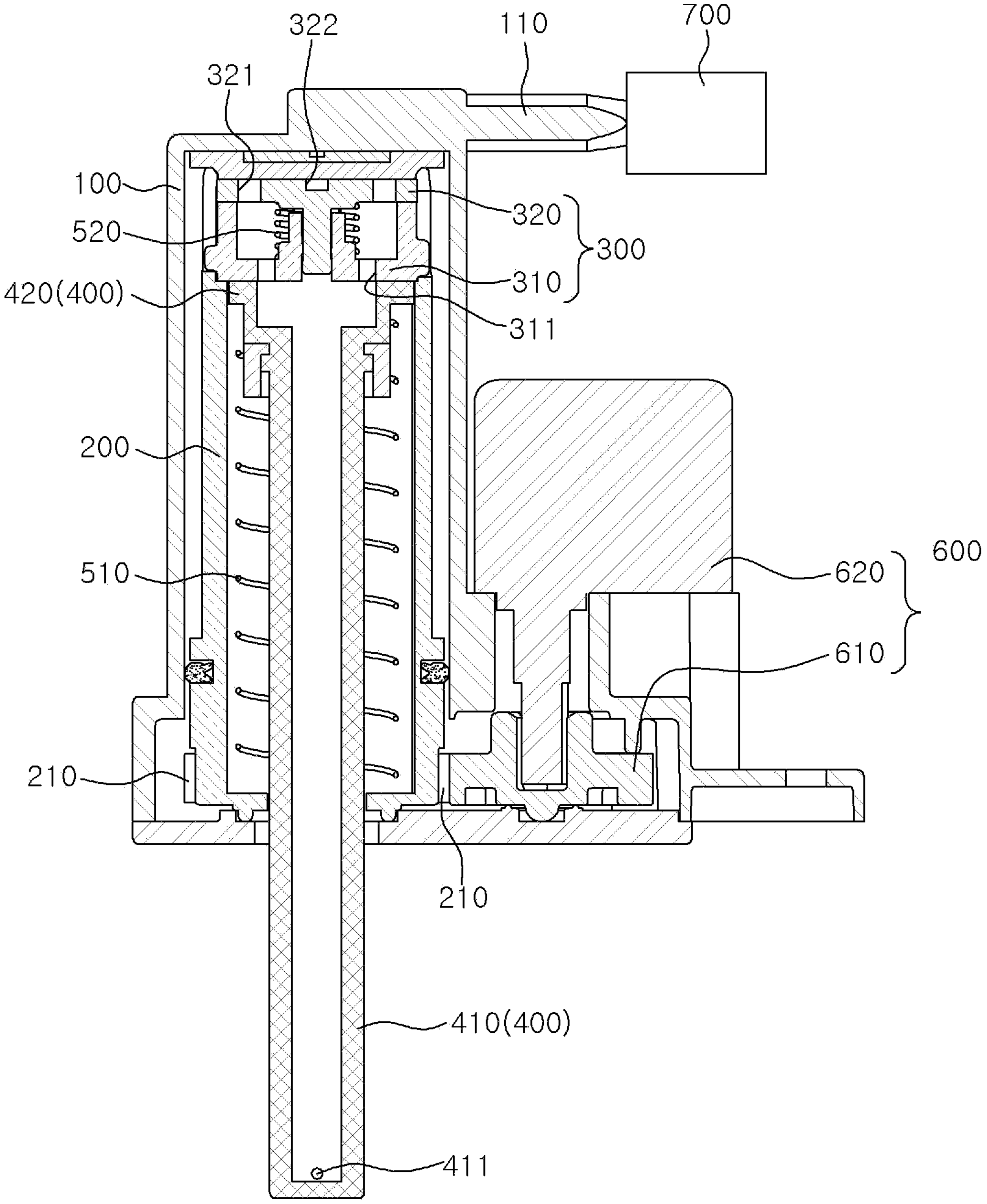
FIG. 6 is a sectional view taken along line VI-VI of FIG. 2.
Figure 7:
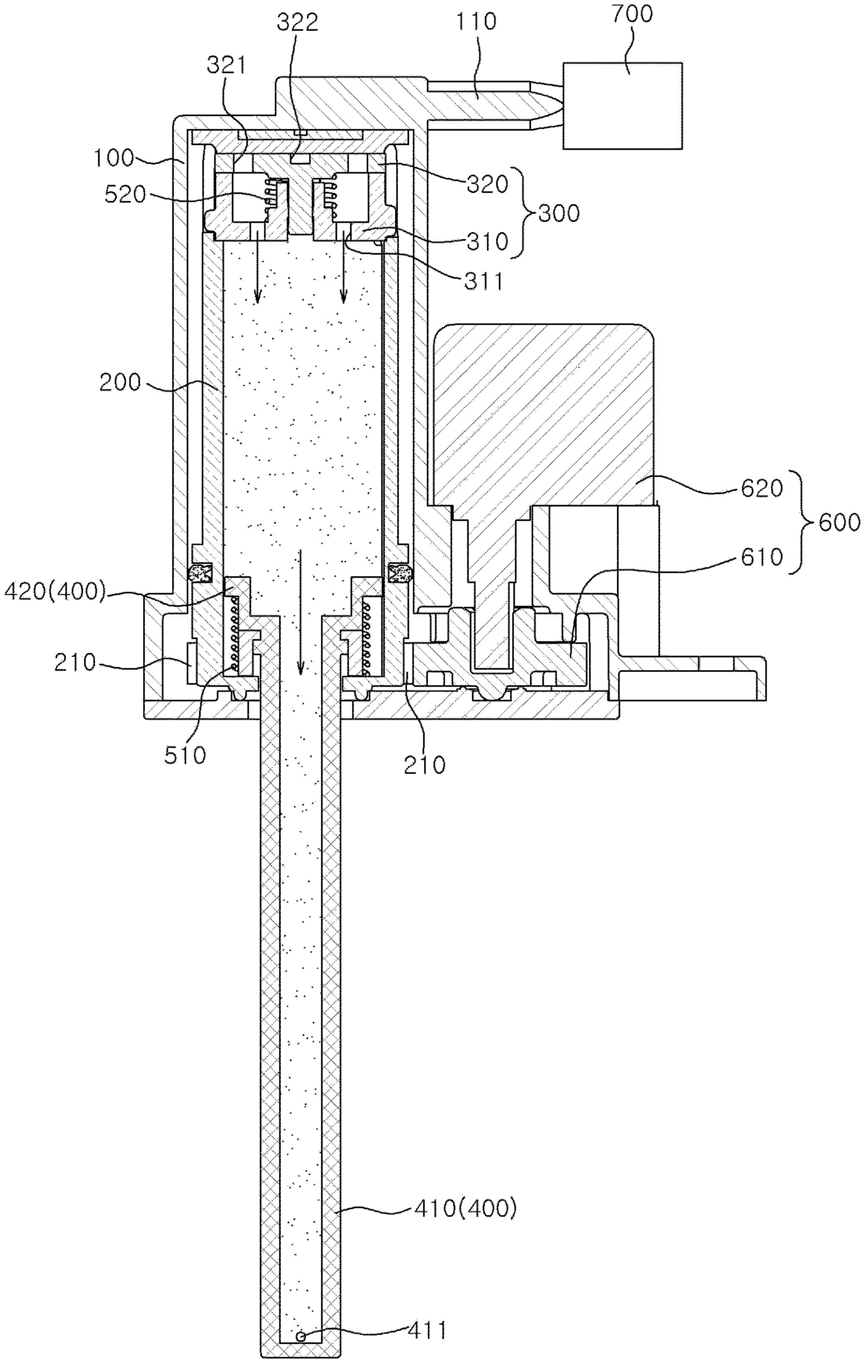
FIG. 7 is a diagram illustrating a state in which a nozzle of FIG. 6 moves to a protruding position.

Referring to FIGS. 6 and 7, when the washing liquid flows into the case 200, the nozzle 400 may move out of the case 200 along the imaginary rotation axis by hydraulic pressure.

Meanwhile, the nozzle 400 may include a nozzle body 410 and a nozzle flange 420.

The nozzle body 410 may move along the imaginary rotation axis while being supported by the case 200. A fluid channel through which the washing liquid may flow may be formed in the central portion of the nozzle body 410. Further, one or more outlets 411 may be formed in one end of the nozzle 400 disposed outside the housing 100. The outlets 411 may be open in a direction that is offset from the direction in which the nozzle 400 extends. For example, the washing liquid flowing along the nozzle 400 may flow along the imaginary rotation axis and then be discharged in a direction perpendicular to the imaginary rotation axis. Further, a plurality of outlets 411 may be provided.

The nozzle flange 420 may be formed on one end of the nozzle body 410. The nozzle flange 420 may be caught by the case 200 to prevent the nozzle body 410 from moving out of the case 200 beyond a predetermined length. Further, the nozzle flange 420 may be caught by the fluid channel switching member 300 to prevent the nozzle body 410 from moving into the case 200 beyond a predetermined length. Such a nozzle flange 420 may have a larger diameter than the nozzle body 410.

The elastic part 500 may provide elastic force to the nozzle 400 and the fluid channel switching member 300. For example, the elastic part 500 may be a spring. Such an elastic part 500 may include a first elastic member 510 and a second elastic member 520.

The first elastic member 510 may provide elastic force to the nozzle 400 to move into the case 200 when the nozzle 400 protrudes out of the case 200. Such a first elastic member 510 may be interposed between the nozzle flange 420 formed on one end of the nozzle 400 and a lower portion of the case 200, and be formed to surround the nozzle 400. For example, when the nozzle 400 is introduced into the case 200, the first elastic member 510 provides upward elastic force to the nozzle 400 to move to an original position thereof.

The second elastic member 520 may provide elastic force to the switching part 320 so that the switching part 320 comes into close contact with the housing 100. Such a second elastic member 520 may be supported by the holder part 310 to provide the elastic force to the switching part 320. For example, the second elastic member 520 may provide upward elastic force so that the switching part 320 comes into close contact with the upper surface of the housing 100. Due to the second elastic member 520, the switching part 320 may come into close contact with the housing 100, and washing liquid may not leak between the switching part 320 and the housing 100.

The driving part 600 may provide power to rotate the nozzle gear 210. Further, the driving part 600 may switch the fluid channel switching member 300 from one of the first water discharge state and the second water discharge state to the other state. The driving part 600 may include the drive gear 610 and an actuator 620.

The drive gear 610 may be supported on the bottom of the housing 100 to be rotatable relative to the housing 100. The drive gear 610 may engage with the nozzle gear 210, and be rotated by the actuator 620.

The actuator 620 may provide power to rotate the drive gear 610.

The valve part 700 may be opened or closed to control the flow of the washing liquid introduced into the housing 100 through the water inflow channel 110. For example, the valve part 700 may control the flow of the washing liquid introduced into the case 200. The opening and closing of the valve part 700 may be controlled by the control device 900.

The sensor 800 may detect whether the position of the outlet 411 has reached a predetermined position in the toilet bowl. As the sensor 800, a known sensor such as an infrared sensor may be used. Information detected by the sensor 800 may be transmitted to the control device 900.

The control device 900 may control the operations of the driving part 600 and the valve part 700. When it is necessary to cause the washing liquid to flow to the nozzle assembly 30, the control device 900 may control the driving part 600 so that the fluid channel switching member 300 is in the first water discharge state. In this case, the nozzle gear 210, the case 200, and the fluid channel switching member 300 may be rotated at a predetermined angle by the driving part 600. Further, the water inflow channel 110, the first fluid channel 321, and the interior of the case 200 may communicate with each other. For example, in the case where the fluid channel switching member 300 is in the first water discharge state, when the valve part 700 is opened, the washing liquid may flow from the water inflow channel 110 into the case 200, and then be discharged through the nozzle 400 into the toilet bowl 2. In this case, the control device 900 may control the driving part 600 to continuously rotate the nozzle 400, and the washing liquid may be discharged into the toilet bowl 2 while the nozzle 400 rotates. As a more detailed example, the nozzle 400 may discharge the washing liquid while rotating within a range of more than 180° and less than 360° in which the first fluid channel 321 extends.

When it is necessary to cause the washing liquid to flow to the washing part 40, the control device 900 may control the driving part 600 so that the fluid channel switching member 300 is in the second water discharge state. In this case, each of the nozzle gear 210, the case 200, and the fluid channel switching member 300 may be rotated at a predetermined angle. Further, the water inflow channel 110, the second fluid channel 322, and the water discharge channel 120 may communicate with each other. For example, in the case where the fluid channel switching member 300 is in the second water discharge state, when the valve part 700 is opened, the washing liquid may flow from the water inflow channel 110 to the water discharge channel 120, and then be discharged through the washing part 40.

The control device 900 may be implemented by a calculation device including a microprocessor, a measuring device such as a sensor, and a memory. Since the implementation method is obvious to those skilled in the art, a detailed description thereof will be omitted herein.

The washing part 40 may communicate with the water discharge channel 120, and may spray washing liquid introduced from the water discharge channel 120 toward the outer surface of a cleaning nozzle (not shown). Here, the cleaning nozzle refers to a nozzle that sprays cleaning water toward a user. For example, the washing part 40 may have a nozzle shape.

As described above, the nozzle assembly 30 according to an embodiment of the present disclosure can switch the fluid channel switching member 300 to the first water discharge state or the second water discharge state simply by operating the driving part 600 that rotates the nozzle 400. That is, it is possible to selectively flow the washing liquid toward the nozzle assembly 30 or the washing part 40 simply by controlling the driving part 600.

Further, the bidet 1 does not have to include the valve and the fluid channel for each of the nozzle assembly 30 and the washing part 40, so that the number of valves and fluid channels is minimized, which results in cost reduction.

Although the embodiments of the present disclosure have been described as specific embodiments, these are merely examples. The present disclosure is not limited to the above, and should be interpreted as having the widest scope according to the technical idea disclosed in the present specification. Those skilled in the art may combine/substitute the disclosed embodiments to implement a pattern of a shape not disclosed, but this also does not depart from the scope of the present disclosure. In addition, those skilled in the art may easily change or modify the disclosed embodiments based on the present specification, and it is clear that such changes or modifications also fall within the scope of the present disclosure.

The invention claimed is:

1. A nozzle assembly comprising:

a housing provided with a water inflow channel and a water discharge channel;

a fluid channel switching member in which a first fluid channel that provides a path allowing a washing liquid introduced from the water inflow channel to flow therethrough and a second fluid channel that does not communicate with the first fluid channel are formed, wherein the fluid channel switching member is selectively placed in any one of a first water discharge state in which the water inflow channel communicates with the first fluid channel and a second water discharge state in which the water inflow channel communicates with the second fluid channel;

a case which supports the fluid channel switching member and is disposed in the housing; and a nozzle having one end extending to be exposed to an outside of the case and the other end disposed inside the case to communicate with the first fluid channel, wherein the fluid channel switching member is configured such that the fluid channel switching member rotates at a predetermined angle about an imaginary rotation axis extending along an extension direction of the nozzle within the housing to change from any one of the first water discharge state and the second water discharge state to the other state, wherein the fluid channel switching member guides a flow of the washing liquid so that the washing liquid introduced through the water inflow channel flows through the first fluid channel toward the nozzle, when the fluid channel switching member switching member is in the first water discharge state, wherein the fluid channel switching member guides the flow of the washing liquid so that the washing liquid introduced through the water inflow channel bypasses the first fluid channel and flows through the second fluid channel toward the water discharge channel, when the fluid channel switching member switching member is in the second water discharge state, wherein the first fluid channel is a hole extending along a circumferential direction of the fluid channel switching member so that both ends thereof are spaced apart from each other, wherein the second fluid channel has a shape of a hole extending along a linear direction that is offset from the circumferential direction, and at least a portion of the second fluid channel is placed on an imaginary curve extending along the circumferential direction between the both ends of the first fluid channel, wherein the nozzle includes a plurality of outlets that communicate with the second fluid channel to discharge the washing liquid, and wherein the first fluid channel is extended so that an angle between two imaginary straight lines extending from a center of the fluid channel switching member toward the both ends exceeds a predetermined rotation angle, and the predetermined rotation angle satisfies the following equation, $$\text{Rotation angle} = 360°/N \text{ where } N \text{ is the number of outlets.} \quad \text{[Equation]}$$

2. The nozzle assembly of claim 1, wherein the water inflow channel is connected to a surface of the housing to communicate with an interior of the housing, and wherein the nozzle assembly further comprises:

an elastic part providing elastic force to the fluid channel switching member in a direction in which the fluid channel switching member comes into close contact with the surface so that the fluid channel switching member is rotated while being in close contact with the surface of the housing.

3. The nozzle assembly of claim 2, wherein the fluid channel switching member includes:

a switching part in which the first fluid channel and the second fluid channel are formed, the switching part coming into close contact with the surface of the housing; and a holder part supported by the case and holding the switching part, and wherein the elastic part is held by the holder part to provide the elastic force to the switching part.

4. The nozzle assembly of claim 1, further comprising:

a driving part that rotates the case about the imaginary rotation axis, wherein the fluid channel switching member is rotated in response to the case rotated by the driving part to change from any one of the first water discharge state and the second water discharge state to the other state.

5. A bidet comprising:

the nozzle assembly according to claim 1; and a frame that supports the nozzle assembly and is to be supported on a toilet bowl.

6. A bidet comprising:

the nozzle assembly according to claim 2; and a frame that supports the nozzle assembly and is to be supported on a toilet bowl.

7. A bidet comprising:

the nozzle assembly according to claim 3; and a frame that supports the nozzle assembly and is to be supported on a toilet bowl.

8. A bidet comprising:

the nozzle assembly according to claim 4; and a frame that supports the nozzle assembly and is to be supported on a toilet bowl.

* * * * *